(12) United States Patent
Bhargava

(10) Patent No.: US 7,908,160 B2
(45) Date of Patent: Mar. 15, 2011

(54) SYSTEM AND METHOD FOR PRODUCING AUDIT TRAILS

(75) Inventor: Rajeev Bhargava, Richmond Hill (CA)

(73) Assignee: Decision-Zone Inc., Richmond Hill (CA)

(*) Notice: Subject to any disclaimer, the term of this patent is extended or adjusted under 35 U.S.C. 154(b) by 1220 days.

(21) Appl. No.: 11/530,885

(22) Filed: Sep. 11, 2006

(65) Prior Publication Data

US 2008/0065400 A1 Mar. 13, 2008

(51) Int. Cl.
*G06F 17/50* (2006.01)

(52) U.S. Cl. ............................................. 705/7; 705/11

(58) Field of Classification Search ............... 705/7, 11
See application file for complete search history.

(56) References Cited

U.S. PATENT DOCUMENTS

| | | | |
|---|---|---|---|
| 6,278,977 B1* | 8/2001 | Agrawal et al. | 705/7 |
| 6,494,831 B1* | 12/2002 | Koritzinsky | 600/301 |
| 6,639,975 B1* | 10/2003 | O'Neal et al. | 379/112.01 |
| 7,441,249 B2* | 10/2008 | Adachi et al. | 719/313 |
| 2003/0050789 A1* | 3/2003 | Hasson et al. | 705/1 |
| 2004/0260634 A1* | 12/2004 | King et al. | 705/35 |
| 2005/0171810 A1* | 8/2005 | Klein et al. | 705/1 |
| 2006/0184410 A1* | 8/2006 | Ramamurthy et al. | 705/8 |

OTHER PUBLICATIONS

Agrawal, Rakesh, Johnson, Christopher, Kiernan and Leymann, Frank."Taming compliance with Sarbanes-Oxely Internal Controls Using Database Technology." Nov. 2005.*

IBM."e-business Process Automation IBM MQSeries Workflow-adaptive business middleware that helps accelerate delivery, integration and change." Apr. 2000.*

Stohr, Edward A., Zhao, J. Leon,"Workflow Automation: Overview and Reasearch Issues." Information Systems Frontier 3:3, pp. 281-296, 2001.*

Casati, Fabio and Shan, Ming-Chien."Process Automation as the foundation for E-Business," Proceedings of the 26th International Conference on Very Large Databases, Cairo, Egypt, 2000.*

* cited by examiner

*Primary Examiner* — Beth V Boswell
*Assistant Examiner* — Renae Feacher
(74) *Attorney, Agent, or Firm* — Clark & Brody

(57) ABSTRACT

Business Processes handle business transactions. The life cycle of a transaction is controlled by state of the process and events. Events represent information exchange between systems. The states determine when the exchange should take place.

Key issues are to identify whether a transaction is anomalous and if so, determining the trace to the root cause To detect anomalies, current approaches evaluate transaction data statistically. To validate whether the transaction is indeed anomalous requires significant storage, processing power and human resources.

The new approach audits events as they happen against the business process definition. Events that do not follow the right sequences and conditions of the process definition are identified to be anomalous. The generated audit trail traces the root cause of the transaction anomaly.

Businesses can now protect or re-engineer their strategic business processes using audit trail traces.

15 Claims, 4 Drawing Sheets

SYSTEM AND METHOD FOR PRODUCING AUDIT TRAILS

FIELD OF THE INVENTION

The invention relates to systems and methods for processing data stored in electronic format, and in particular systems and apparatus for correlating such data using process description and providing output representing data audit traces.

BACKGROUND OF THE INVENTION

A business process represents a collection of related, structured activities—a chain of events—that produce a specific service or product for a particular customer or customers. The design of the business process can be captured using various modeling technologies and can be automated using an engine or set of engines—business process engines. The automation is optional—only one part can be automated or even none. The state of the business process is changed every time an event is generated and it will end when a final state is reached.

For audit purposes, currently, sample data is retrieved and analyzed manually by a third-party team of domain experts. The result of this lengthy and fault-prone process is an audit report that confirms or rejects the assumption that the process is executed according to the design specifications.

Current audit methodologies are not automated and have a big latency factor that precludes them from being used for real time transactional validation.

SUMMARY OF THE INVENTION

The present invention improves upon heretofore known audit systems by providing a real-time, automated business process audit system, and more particularly a computerized business process audit system that detects anomalies and provides audit trails based on event data received from one or more sources.

The present invention in one embodiment can be characterized as a system for anomaly detection in structured sets of events. Such system employs a set of event listeners that collect raw event data, a correlator and a notification component. The notification component sends audit events comprised from raw events grouped and annotated with correlation attributes. These audit events are processed or logged on a downstream location.

The correlator loads the process definition from an external file. This file format can be any of the business process definition language formats available: XMI/BPMN/BPEL but not limited to those. The loaded process definition contains the cause-effect relationships between the events specified. Also it contains any guard conditions that are used to validate the events during the execution phase.

The event listeners can be real-time or historical and are configured using a mapping file. The real-time event listeners will trigger the correlation component immediately after an event was received. The historical event listeners simulate 'virtual events' from historical storage (databases/logs/ . . . ) and will not trigger the correlation component.

In a variation of the system of the one embodiment, the system further employs a causal pattern detection layer that applies pattern expressions on the audit grouped raw events contained in the audit event. The result of the pattern expression evaluation is considered to be a filtered instance of a causal audit event. This filtered audit events are then pushed through a notification component to be sent for further processing on a downstream location.

In an additional variation of the system of the one embodiment, the system further employs a behavior analysis layer that monitors changes in the model associated to the audit event flow. This layer collects data to build a clustering model for the configured fields from the audit event. After enough data was collected and a model was built, without human intervention, this layer will signal when an input (audit) event can be considered as a large variation from the rules captured in the model. Periodically, when new data is available, this processing layer will update its model thus adapting to the changing environment.

BRIEF DESCRIPTION OF THE DRAWINGS

The invention is illustrated in the figures of the accompanying drawings which are meant to be exemplary and not limiting, in which like references are intended to refer to like or corresponding parts, and in which.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
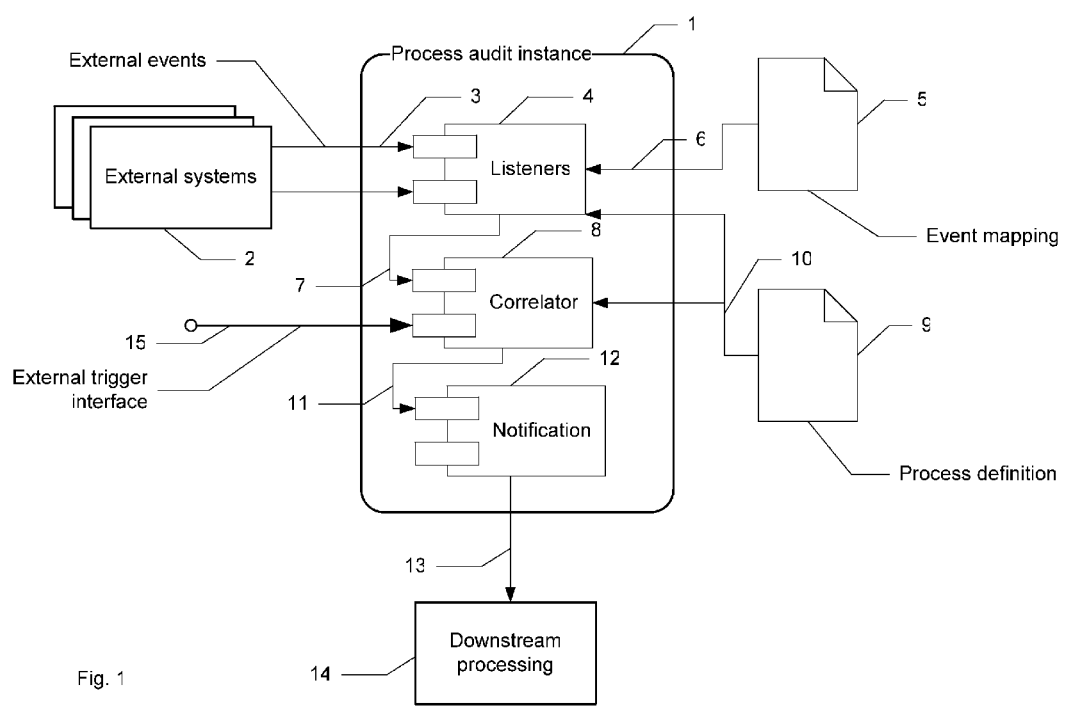
FIG. 1 is a schematic block diagram of an automated process audit system of one embodiment in accordance with the present invention.

Referring first to FIG. 1. a block diagram is shown of an automated process audit system 1 and method in accordance with one embodiment of the present invention. The automated process audit system is broken in sequential processing blocks: Listeners 4, Correlator 8, Notification 12.

During the business process lifecycle, external systems 2 involved in the choreography of actions and events 3 exchange messages and generate or update data in various storage mediums. The cause and effect relationships between the events that trigger state changes are captured using various modeling tools in a form of a business process definition. This triggering of the state change—transition—can be 'guarded' by a condition that controls the state changing based on the result of the guard condition expression evaluation. The guard condition expression can include references to data internal or external to the process.

This business process definition usually can be used for but not limited to: automating the business process execution, documentation or—as described in this invention—for audit purposes.

Figure 4:
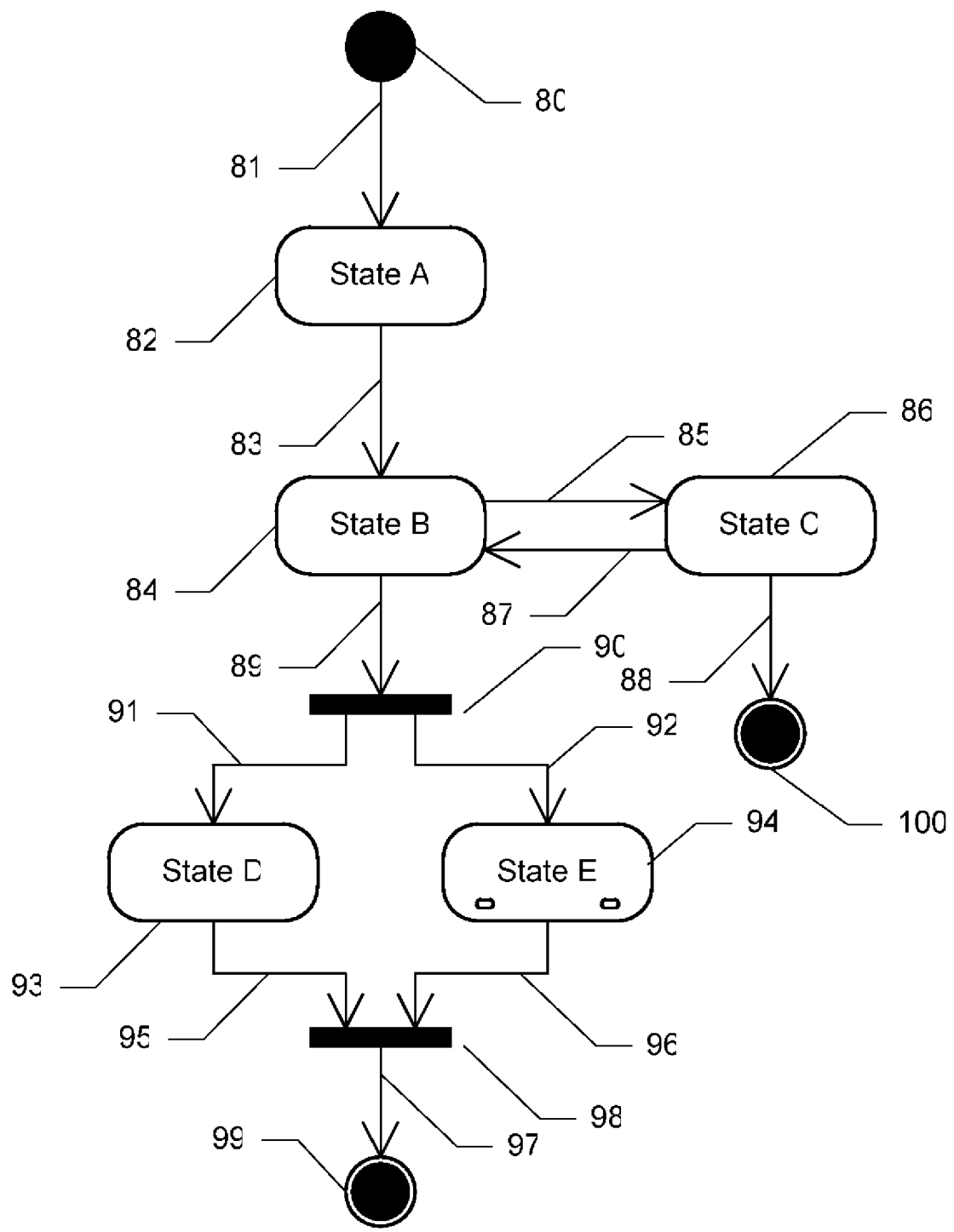
FIG. 4 is a sample business process diagram as captured by most modeling tools. Usually uses notations compatible to UML statechart diagram specifications.

As an example, the FIG. 4 illustrates a business process comprised of:
  initial state 80 (pseudo state)
  states 82, 84, 86, 93, 94. (94 is a composite state an the process audit will drill down and handle it as a regular business process)
  pseudo states 90, 98 final states 99, 100 (pseudo state)
transitions 81,83,85,87,89,91,92,88,95,96,97

Not specified in the diagram in the FIG. 4 are the trigger events associated with the transitions.

For the process audit system 1 to reach the events 3 that are generated by the external systems 2, a 'listeners' component 4 needs to be configured by loading 6 event mapping configuration data 5 and guard condition expressions from the process definition 9. This data specifies how the process audit system will access the required middleware and what technology to use to gain access to the event 3.

After the 'listeners' component 4 has established the connectivity to the event sources throughout the enterprise, upon receiving of an event, the 'listeners' component 4 will manage the storage and access of the event payload.

The 'listeners' 4 component will notify 7 the correlator 8 when a new event or an anomaly was detected at the listener level. The correlator 8 component loads 10 the process definition 9 as configuration data. When triggered by the 'listeners' 4 component or externally through the external trigger interface 15, the correlation algorithm will be executed on the available data. The result 11 in form of event sets assembled together by the correlation component—according to their receive order and relationships defined in the process definition—is supplied to the notification 12 component to be converted to an external format and pushed 13 for further downstream processing 14.

Figure 2:
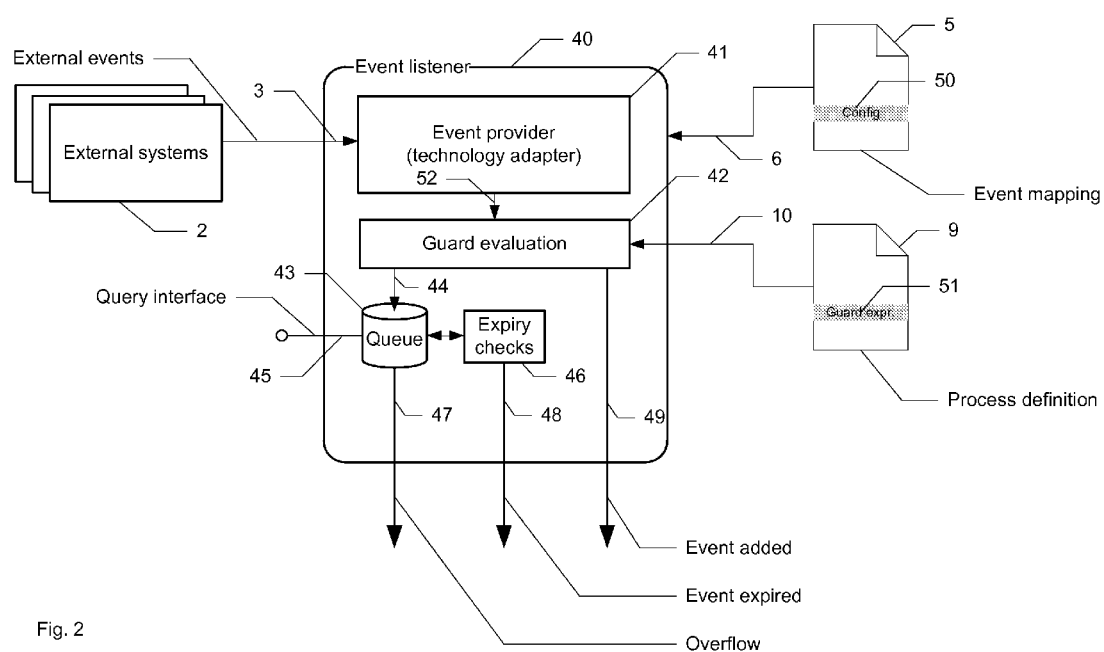
FIG. 2 is a schematic block diagram of the 'listeners' component of the process audit system of one embodiment in accordance with the present invention.

Referring to FIG. 2, the preferred architecture but not limited to, for the 'listeners' component 4 consists of multiple event listeners 40 created according to the configuration data. Each event listener 40 consists of the following processing blocks:

Event provider 41—its role is to connect to a physical system and extract (listen for) events. The event data will be converted to a normalized format internal.

Guard evaluation 42—if there is a guard condition defined for the transition associated with the configured event, this component will load 10 the guard condition 51 from the process definition 9. Always, the data available as the event payload can be accessible to the guard condition expression evaluation. In addition, the system can be configured to expand the guard condition 51 expression evaluation scope to the payload of all related events pre-correlated by the correlator component 8. External data can be accessed during the expression evaluation. The language and preprocessing directives can be specified in the process definition 9 data. This component 42 can load the appropriate expression evaluator and setup the required resources for expression evaluation.

Queue 43—Historical storage for the events that passed the guard expression evaluation. It offers a query interface 45 used to locate and consume an event. Typically a limit is enforced on the number of events stored into the queue and when this limit is exceeded, an overflow event 47 will be generated. The implementation of the queue is configurable and plug-in based.

Expiry checks 46—for queues that store events that have an expiry period associated with them, this component verifies periodically the contents of the queue 43 for event that have exceeded their preset storage time. All expired event will be removed from the storage queue and tagged as expired and an 'event expired' 48 event will be generated.

When an external system generates an event, the event provider 41 will receive it and convert it to a normalized format internal ready for guard expression evaluation. If there is no guard condition associate to the corresponding transition, the guard evaluation 42 component will assume a successful validation of the transition. If the guard condition evaluation was successful, the event will be stored in the associated queue 43 for later retrieval. If an expiry period is configured for this event listener, periodically, the contents of the queue 47 are verified by 'expiry checks' 46 so that no event older than the expiry period is in queue. If an event is found to be 'expired', then it is removed from the queue 43 and an 'event expired' 48 is generated.

Figure 3:
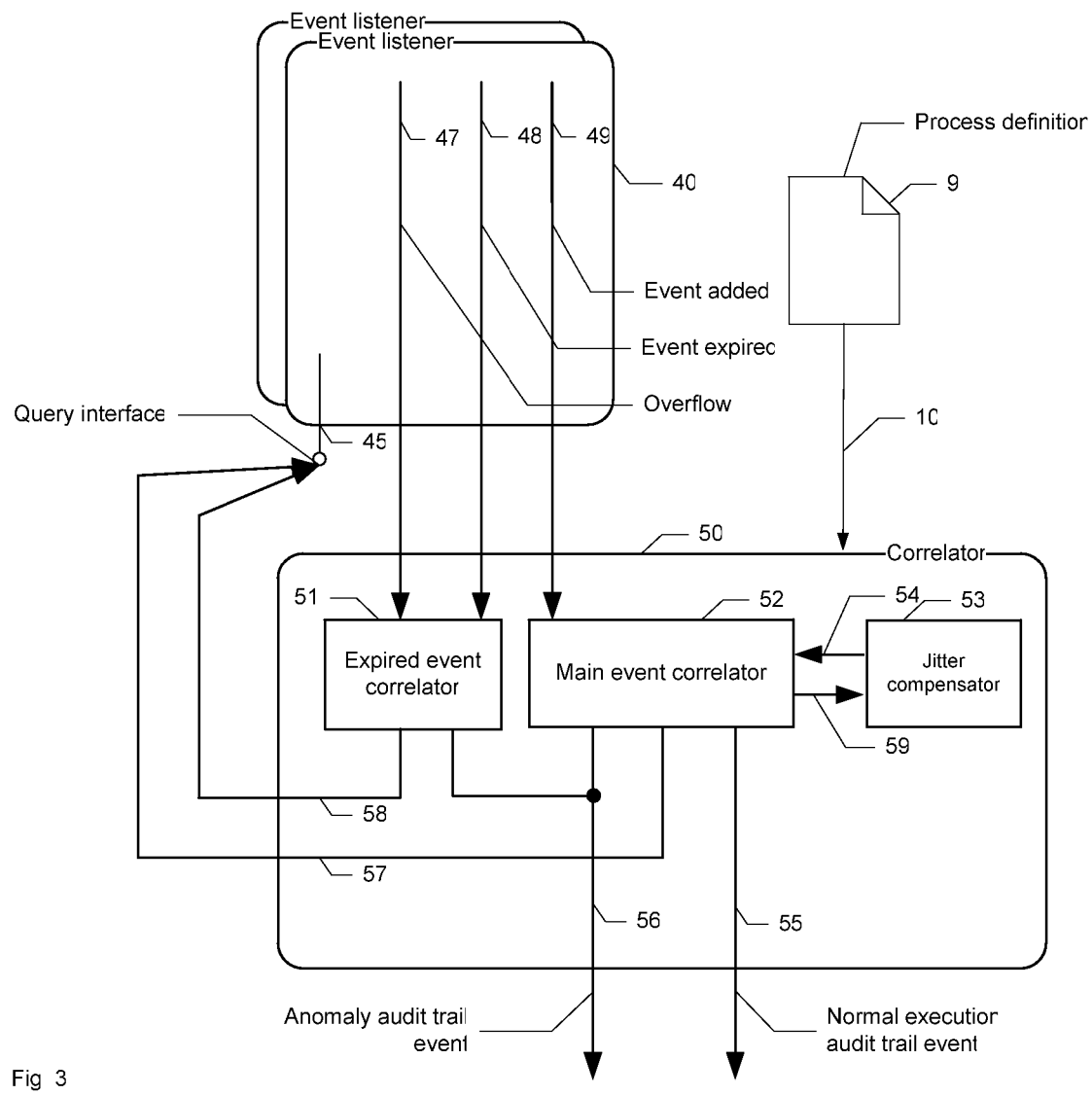
FIG. 3 is a schematic block diagram of the 'correlator' component of the process audit system of one embodiment in accordance with the present invention.

Referring to FIG. 3, the preferred architecture but not limited to, for the 'Correlator' 50 component consists of a main event correlator 52 and an expired event correlator 51. Since the order of the events is relevant for any process audit, for real-time business process audit, a jitter compensator 53 will delay processing to accommodate for the uneven propagation delays in the middleware systems.

The correlator 50 loads 10 the process definition 9 data to be used during the correlation of the events 47, 48, 49 coming from event listeners 40.

On receive of an 'event added' 49, the main event correlator will check if the associated transition from the process definition has as a target a final state 99,100. If true, the main correlator will traverse the process definition 9 in reverse, towards the 'initial' state 80 of the business process. For every transition, the correlator will check the event listener 40—associated to the event for that transition—for available event data. This query 57 is performed through the query interface 45. When the process traversal is completed, all identified events are marked as consumed and a normal execution audit trail event 55 is generated. This event contains the list of all events causally related according to the business process specifications 9.

If during the process traversal, an instance of an event specified in business process definition 9 in is not found in the associated event listener 40 queue (queried through the query interface), the processing is suspended 59 by the jitter compensator 53. When the jitter period has expired, the correlation resumes 54. If at that time, the required event data is still not found, then the correlation process ends and an anomaly audit trail event 56 is generated. This event has the same structure as a normal execution audit trail event 55 but it is flagged by an 'anomaly=true' attribute.

On receive of an 'event expired' 48 or 'overflow event' 47, the expired event correlator will start the correlation process by traversing the process definition 9 in upwards towards the 'initial' state 80 of the business process and downwards, towards the 'final' state 99,100. For every transition, the correlator will check the event listener 40—associated to the event for that transition—for available event data. This query 58 is performed through the query interface 45. When no more events are found, the process traversal is completed, all identified events are marked as consumed and an anomaly audit trail event 56 is generated. This event contains the list of all events causally related according to the business process specifications 9. It will be flagged by an 'anomaly=true' attribute.

Referring to FIG. 1. the notification component 12 accepts events 11 of type anomaly 56 or normal 55 execution audit trail and translates their content in a native middleware message format using an user configurable technology adapter. The resulting message 13 is pushed for downstream processing 14 on external systems.

The invention claimed is:

1. A method for generating audit trails, comprising:
establishing a connection between an event listener component and at least one event source;

collecting event data for one of a plurality of events from the at least one event source at the event listener component;

responsive to collecting the event data, transmitting an event notification from the event listener component to a correlator;

loading a process definition at the correlator, the process definition defining a plurality of state transitions each associated with different ones of the plurality of events;

responsive to receiving the event notification, determining at the correlator that the event data is representative of a state transition to a final process state;

traversing the process definition in reverse by a computer and, for each one of the plurality of state transitions, transmitting a query to the event listener component to retrieve the event associated with the one of the plurality of state transitions;

determining if all of the events associated with the plurality of state transitions have been retrieved or have not been retrieved;

generating, by the computer, at least one audit trail event at the correlator, based on the event data collected at the event listener component; wherein if all of the events associated with the plurality of state transitions are retrieved, a normal audit trail event is generated, and if one or more events associated with the plurality of state transitions are not retrieved, an anomaly audit trail event is generated; and transmitting the at least one audit trail event to a notification component.

2. The method of claim 1, further comprising:
prior to establishing the connection, loading event mapping data at the event listener component.

3. The method of claim 1, further comprising:
responsive to collecting the event data, storing the event data in a queue at the event listener component.

4. The method of claim 1, wherein the query is transmitted via a query interface.

5. The method of claim 1, further comprising, for each one of the plurality of state transitions:
following transmission of the query to the event listener component, if the associated event is not retrieved, suspending further processing until a jitter period has expired;
following expiry of the jitter period, advancing to the next one of the plurality of state transitions.

6. The method of claim 1, further comprising:
receiving the at least one audit trail event at the notification component;
translating the received at least one audit trail event into a middleware message format; and
forwarding the translated at least one audit trail event to an external system.

7. The method of claim 1, wherein the event listener component further comprises an event provider and a guard evaluation component, and wherein collecting the event data comprises:
receiving the event data for the event from the at least one event source at the event provider;
loading a guard condition associated with the event at the guard evaluation component;
determining whether the guard condition is satisfied; and, when the guard condition is satisfied, transmitting the event notification to the correlator and storing the event data in the queue.

8. A system for generating audit trails, comprising:
a computer;
an event listener component for establishing a connection to at least one event source, the event listener component configured to collect event data for one of a plurality of events from the at least one event source and to transmit an event notification;

a correlator configured to load a process definition, the process definition defining a plurality of state transitions each associated with different ones of the plurality of events;

the correlator further configured to determine, responsive to receiving the event notification, if the event data is representative of a state transition to a final process state; and, when the determination is affirmative, to traverse the process definition in reverse by a computer and, for each one of the plurality of state transitions, to transmit a query to the event listener component for retrieving the event associated with the one of the plurality of state transitions;

the correlator further configured to receive the event notification and generate, by the computer, at least one audit trail event, based on the event data collected at the event listener component;

the correlator being further configured, if all of the events associated with the plurality of state transitions are retrieved, to generate a normal audit trail event; and, if one or more of the events associated with the plurality of state transitions are not retrieved, to generate an anomaly audit trail event;

the correlator further configured to transmit the at least one audit trail event; and, a notification component configured to receive the at least one audit trail event from the correlator.

9. The system of claim 8, the event listener component being further configured to load event mapping data prior to establishing the connection.

10. The system of claim 8, wherein the event listener component comprises a plurality of event listeners, each event listener including an event queue and being configured to store the event data in the event queue.

11. The system of claim 8, further comprising a query interface for carrying the query transmitted by the correlator.

12. The method of claim 8, the correlator being further configured:
for each one of the plurality of state transitions, following transmission of the query to the event listener component, if the associated event is not retrieved, to suspend further processing until a jitter period has expired; and
following expiry of the jitter period, to advance to the next state transition.

13. The system of claim 8, the notification component being further configured to receive the at least one audit trail event at the notification component, to translate the received at least one audit trail event into a middleware message format; and to forward the translated at least one audit trail event to an external system.

14. The system of claim 10, wherein each event listener further comprises:
an event provider configured to receive the event data for the event from the at least one event source; and
a guard evaluation component configured to load a guard condition associated with the event, to determine whether the guard condition is satisfied, and, when the guard condition is satisfied, to transmit the event notification to the correlator and store the event data in the queue.

15. The system of claim 12, wherein the correlator comprises a main event correlator for generating at least one audit trail event and a jitter compensator for suspending further processing until the jitter period has expired.

* * * * *